United States Patent [19]

Heine

[11] Patent Number: 4,508,395
[45] Date of Patent: Apr. 2, 1985

[54] HIGH CAPACITY LINEAR ROTARY BEARING

[75] Inventor: Otto R. Heine, Poway, Calif.

[73] Assignee: R&H Technology, Inc., Minneapolis, Minn.

[21] Appl. No.: 614,262

[22] Filed: May 25, 1984

[51] Int. Cl.³ .............................................. F16C 29/06
[52] U.S. Cl. .................................................... 308/6 C
[58] Field of Search ...................... 308/6 C, 6 R, 6 A; 464/168

[56] References Cited

U.S. PATENT DOCUMENTS

| | | | |
|---|---|---|---|
| 2,945,366 | 7/1960 | Sears | 64/23 |
| 3,037,821 | 6/1962 | Schutz | 308/6 |
| 3,086,824 | 4/1963 | Barkley | 308/6 |
| 3,446,540 | 5/1969 | Geffner | 308/6 |
| 3,582,160 | 6/1971 | Schutz | 308/6 |
| 3,692,371 | 9/1972 | Geffner | 308/6 C |
| 3,751,121 | 8/1973 | Geffner | 308/6 C |
| 4,025,128 | 11/1975 | Geffner | 308/6 C |
| 4,127,309 | 11/1978 | Teramachi | 308/6 C |
| 4,139,242 | 2/1979 | Ernst et al. | 464/168 |
| 4,294,100 | 10/1981 | Olschewski et al. | 308/6 C |
| 4,303,280 | 12/1981 | Geffner | 308/6 C |
| 4,309,061 | 1/1982 | Teramachi | 308/6 C |
| 4,334,716 | 6/1982 | Magee et al. | 308/6 C |
| 4,421,363 | 12/1983 | Olschewski et al. | 308/6 C |

Primary Examiner—Lenard A. Footland
Attorney, Agent, or Firm—Klein, Szekeres & Fischer

[57] ABSTRACT

A linear rotary bearing is disclosed which includes bearing race adapted to be mounted on a substantially cylindrical shaft in spaced concentric relationship with the shaft. A ball retainer disposed between the race and the shaft defines a plurality of longitudinally disposed ball channels. An outer housing is mounted on the exterior of the race. A plurality of longitudinally disposed ball return channels are formed between the housing and the race. An annular chamber is formed in each end of the bearing between the race and the housing. Balls placed into the bearing do not entirely fill the space available for the balls in the ball channels, ball return channels, and annular chambers. During linear motion of the bearing relative to the shaft the balls behave substantially like a fluid in the sense that they randomly move from the annular chambers into the ball channels and ball return channels to fill available space. Approximately 2.5 times more load carrying ball channels can be incorporated into the bearing of the invention than into prior art linear rotary bearings of comparable size, with a resulting increase in load carrying capacity.

20 Claims, 5 Drawing Figures

U.S. Patent  Apr. 2, 1985  4,508,395
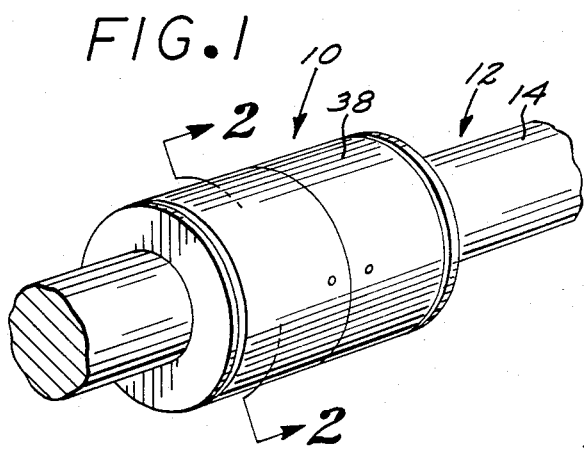
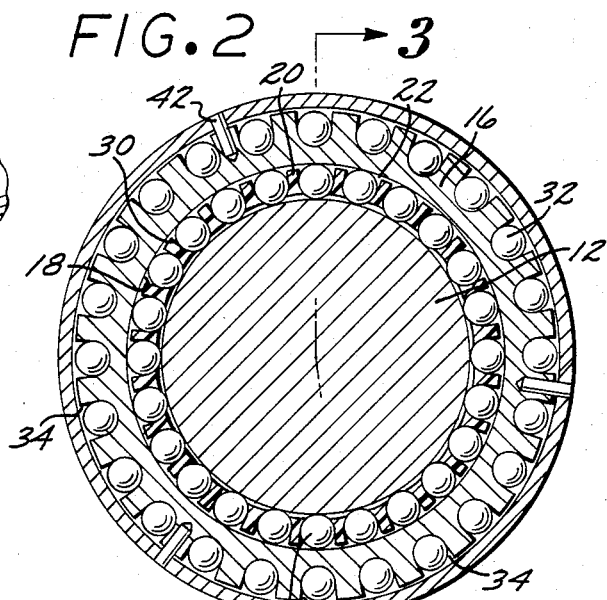
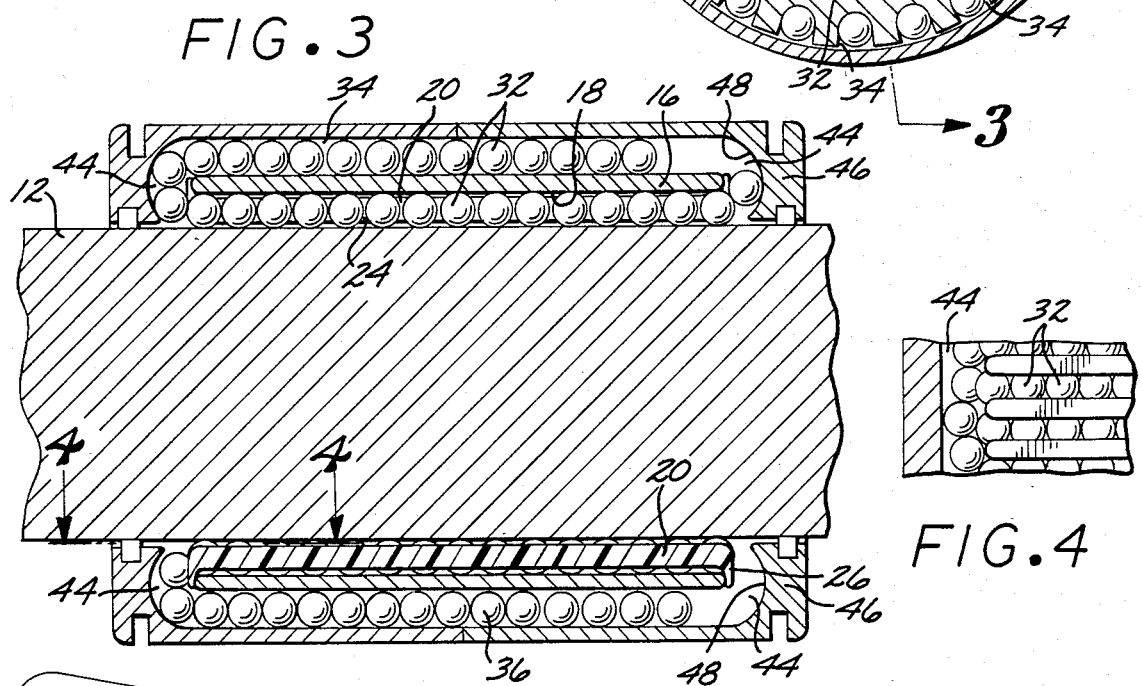
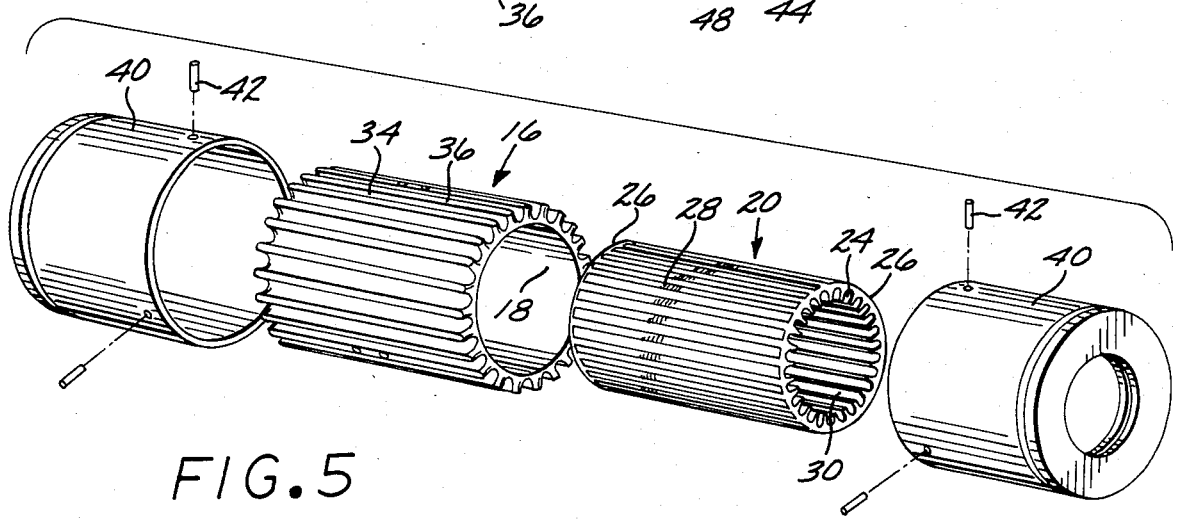

HIGH CAPACITY LINEAR ROTARY BEARING

BACKGROUND OF THE INVENTION

1. Field of the Invention

The present invention is directed to linear rotary bearings. More particularly, the present invention is directed to linear rotary bearings wherein load bearing elements circulate freely to support large loads relative to the size of the bearing.

2. Brief Description of the Prior Art

Bearings which permit both linear and rotary movement of a machine part on a shaft have been known for a long time. Examples of varying constructions of such linear rotary bearings can be found in U.S. Pat. Nos. 4,025,128; 4,303,280; 3,086,824; 3,751,121; 3,446,540, 3,037,821; 3,582,160, and 3,692,371. Ball elements which move in dedicated guide channels in closed loop paths as the bearing moves linearly relative to its supporting shaft, comprise a common feature of the above-noted prior art linear rotary bearings.

As is well appreciated by those skilled in the art, machining the relatively complex loops and guide channels of the above-noted prior art linear rotary bearings is rather labor intensive. Therefore, these prior art bearings are rather expensive. In addition, the dedicated ball channels of some of the prior art bearings cause the supporting shaft to wear unduly fast at certain locations.

In order to avoid the above-noted undue wear of the shaft in fixed locations where the balls repeatedly contact the shaft, the prior art provided relatively complex ball guide channel configurations which have a tendency to distribute the load more evenly over the shaft. The linear rotary bearings described in U.S. Pat. No. 3,086,824 are particularly noteworthy in this regard, because these bearings incorporate cross-over passages between the several guide channels so that the balls circulate in a predetermined pattern in the assembled bearing. Examples of ball spline assemblies which have similar circulating ball channels for linear movement of the spline, relative to a shaft, are found in U.S. Pat. Nos. 2,945,366, 4,309,061, and 4,127,309.

The linear rotary bearings of the prior art are, however, still less than satisfactory from the veiwpoint of complexity of construction and therefore cost. Moreover, the relatively complex ball circulating structures and channels built into the prior art linear rotary bearings cause the bearings to have only small load bearing capacity relative to their size. The present invention solves the above-noted problems, and provides linear rotary bearings of relatively simple construction which nevertheless have relatively high load bearing capacity.

SUMMARY OF THE INVENTION

It is an object of the present invention to provide a linear rotary bearing which has high load bearing capacity relative to its size.

It is another object of the present invention to provide a linear rotary bearing which is relatively inexpensive to manufacture.

It is still another object of the present invention to provide a linear rotary bearing wherein wear of a shaft supporting the bearing is minimized.

These and other objects and advantages are attained by a linear rotary bearing which has a bearing race adapted to be mounted on a support shaft in concentric spaced relationship relative to the shaft. A ball retainer is mounted in the space between the bearing race and the shaft. The ball retainer forms a plurality of longitudinal ball channels which are substantially aligned with the longitudinal axis of the shaft.

A bearing housing is fixedly mounted to the exterior of the bearing race, and a plurality of longitudinally disposed ball return channels are formed between the exterior of the race and the interior of the bearing housing. The housing and the race jointly form an annular chamber substantially at each end of the race.

A plurality of balls are disposed in the ball channels, the ball return channels and the annular chambers. The number of balls is selected in such a manner relative to the combined space in the ball channels, ball return channels, and annular chambers, that void space corresponding to one or more balls is available in said combined space. Each annular chamber includes a curved guiding surface which permit and guide passage of the balls from the ball channels into the ball return channels and vice versa.

During linear movement of the bearing on the shaft, the balls behave in a substantially fluid-like manner in the sense that balls moving from the ball channels to the ball return channels, and vice versa, enter into the appropriate channels to fill available space. The construction of the linear rotary bearing of the present invention permits relatively dense packing of the ball channels and ball return channels, so that a relatively large number of load supporting balls can be provided in the bearing. Consequently, the bearing is capable of supporting relatively large loads.

The features of the present invention can be best understood, together with further objects and advantages, by reference to the following description taken in connection with the accompanying drawings.

BRIEF DESCRIPTION OF THE DRAWINGS

FIG. 1 is a perspective view of the preferred embodiment of the linear rotary bearing of the present invention;

FIG. 2 is a cross-sectional view of the preferred embodiment of the linear rotary bearing of the present invention, the cross-section being taken on lines 2,2 of FIG. 1;

FIG. 3 is another cross-sectional view of the preferred embodiment, the cross-section being taken on lines 3,3 of FIG. 2;

FIG. 4 is still another cross-sectional view, the cross-section being taken on lines 4,4 of FIG. 3, and FIG. 5 is an exploded perspective view of the preferred embodiment of the linear rotary bearing of the present invention, balls of the bearing being omitted from the view for the sake of simplicity of illustration.

DESCRIPTION OF THE PREFERRED EMBODIMENT

The following specification taken in conjunction with the drawings sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Referring now to the drawing figures, and particularly to FIGS. 1 and 5, a preferred embodiment of the linear rotary bearing 10 of the present invention is disclosed. The bearing 10 is adapted to be mounted on a shaft 12 of the type which normally supports linear rotary bearings. Thus, the shaft 12 is of circular cross-section, and has a smooth exterior bearing surface 14.

As it will be readily understood by those skilled in the art, the length of the shaft 12 is not critical for the purposes of the present invention. The function of the linear rotary bearing 10 is to permit, with as little friction as possible, linear and rotary movement on the shaft 12 of an appropriate object, such as the machine part (not shown). The object (not shown), such as the machine part, may be affixed to the bearing 10 by any appropriate fastening means, such as bolts (not shown), nuts (not shown), or welding.

Referring now particularly to FIGS. 2 through 5, the bearing 10 of the present invention is shown to include a bearing race 16. The race 16 substantially has the configuration of a hollow cylinder having a smooth interior bearing surface 18. The race 16 is adapted and configured to be disposed in a substantially concentric, spaced relationship with the shaft 12, as is best shown on the cross-sectional view of FIG. 2.

A ball retainer 20 is mounted in the space 22 disposed between the race 16 and the shaft 12. The ball retainer 20, best shown on the exploded view of FIG. 5, incorporates a plurality of ball channels 24 which are disposed longitudinally, parallel with the longitudinal axis of the shaft 12.

The ball retainer 20 is preferably a body of unitary construction having spaced rings 26 substantially at its two ends, and a plurality of longitudinally disposed connecting members 28. Walls 30 of the connecting members 28 form the ball channels 24. FIG. 2 shows that the walls 30 of the connecting members 28 of the ball retainer 20 are arcuate so as to conform to the balls 32 which are held in the ball retainer 20. The ball retainer 20 is advantageously made of suitable plastic material, although it can also be made of metal. The ball retainer 20 is approximately as long as the race 16.

A plurality of ball return channels 34 are provided in the exterior 36 of the race 16. The ball return channels 34 are preferably machined into the race 16. The ball return channels 34 are disposed longitudinally relative to the shaft 12 and the race 16, and extend the entire length of the race 16.

An outer housing 38 is fixedly mounted to the exterior 36 of the race 16 to enclose the race 16 and to cover the ball return channels 34. The outer housing 38 preferably comprises two substantially identical housing pieces 40. The race 16 is interference fitted into the housing pieces 40. The housing pieces 40 are also secured to the race 16 by suitable pins 42. The foregoing is shown on FIG. 2 and on the exploded view of FIG. 5. Other methods of mounting the housing pieces 40 to one another and to the race 16 are also possible, and may become readily apparent to those skilled in the art.

It is an important feature of the present invention that the assembled outer housing 38 and ball race 16 jointly form an annular cavity or chamber 44 at each end of the bearing 10. The annular chambers 44 are best shown on FIG. 3. An interior wall 46 of the housing 38 forms a curved guiding surface 48 in each annular chamber 44. The curved guiding surfaces 48 are also best shown on FIG. 3. As it is described in more detail below, balls 32 pass through the annular chambers 44 from the ball channels 24 into the ball return channels 34 and vice versa.

In the assembled bearing 10, the balls 32, which form the load bearing elements in the linear rotary bearing 10 of the present invention, are placed into the ball channels 24, the ball return channels 34, and to a limited extent into the annular chambers 44. In the ball channels 24 the balls 32 are held between the arcuate walls 30 of the elongated connecting members 28, so that when the bearing 10 is removed from the shaft 12 for some reason, the balls are retained and do not fall out of the bearing 10.

As another important feature of the present invention the balls 32 do not entirely fill the space of at least one of the ball channels 24, ball return channels 34, and annular chambers 44. Expressed in another way, the number of balls 32 is selected in such a manner that a void is left in the above-noted combined space of the ball channels 24, ball return channels 34, and annular chamber 44. The void corresponds to the volume of a relatively small number of balls 32, the minimum being equivalent to one ball.

As a consequence of the above-described structure, the balls 32 behave substantially like a fluid during linear movement of the bearing 10 on the shaft 12. Thus, as the bearing 10 moves linearly relative to the shaft 12, the balls 32 disposed in the ball channels 24 roll on the shaft 12 and move from one end of the bearing 10 towards the other end. At one end of the bearing 10, balls 32 enter into the ball return channels 34 from the annular chamber 44 while they are continuously pushed by balls 32 exiting from the ball channels 24. At the other end of the bearing 10, the balls 32 enter into the ball channels 24 from the other annular chamber 44 while they are continuously pushed by balls exiting from the ball return channels 34. However, because there is a void in the combined space of the ball channels 24, ball return channels 34, and annular chambers 44, and because the ball channels 24 and ball return channels 36 are interconnected only through the annular chambers 44, none of the balls 32 are dedicated to any specific ball channel 24 or ball return channel 34. Similarly, none of the ball channels 24 and none of the ball return channels 34 are dedicated to balls 32 circulating in a matching channel. Thus, the balls 32 enter into the ball channels 24 or ball return channels 34 in a substantially fluid-like manner to fill available space.

The above-noted random queing of the balls assures substantially uniform load distribution on the balls and on the bearing surface of the race 16, so that wear of the bearing is minimized.

During simple rotation of the linear rotary bearing 10 of the present invention, the balls 32 held in the ball retainer 20 act substantially as in an ordinary rotary bearing, and permit low friction rotary movement of the bearing 10 on the shaft 12.

The foregoing construction and features, particularly the above-described free circulation of the balls 32 among the several ball channels 24 and ball return channels 34, permit the placement of a relatively large number of ball channels 24 and balls 32 into the bearing 10 of the present invention. The bearing of the present invention has approximately 2.5 times more load carrying ball channels than prior art bearings of comparable size.

The above-noted "dense packing" of the balls 32 into the bearing 10 results in relatively high load bearing capacity for the bearing 10 of the present invention. Moreover, the structure of the bearing 10 is relatively uncomplicated as compared to prior art linear rotary bearings, and is therefore relatively economical to manufacture.

Several modifications of the bearing 10 of the present invention may become readily apparent to those skilled in the art in light of the above disclosure. Therefore, the scope of the present invention should be interpreted solely from the following claims.

What is claimed is:

1. A linear rotary bearing, adapted to be mounted on a shaft, the bearing comprising:
    a bearing race adapted to be mounted on the shaft in a concentric spaced relationship relative to said shaft;
    a ball retainer mounted in a space formed between the bearing race and the shaft, the ball retainer forming a plurality of longitudinal ball channels substantially aligned with the longitudinal axis of the shaft;
    a plurality of balls, and
    an outer bearing housing fixedly mounted on the exterior of the bearing race, the housing in combination with the bearing race forming a plurality of longitudinal ball return channels substantially aligned with the longitudinal axis of the shaft, the housing in combination with the bearing race further forming a substantially annular chamber at each end of the bearing, said annular chamber comprising means for the balls to pass from the ball return channels to the ball channels and from the ball channels to the ball return channels, the balls being disposed in the ball channels, in the ball return channels, and in the annular chamber, the number of the balls being such that a void space is available in the ball channels, ball return channels, and annular chamber, whereby during longitudinal movement of the bearing on the shaft the balls pass from the ball return channels to the ball channels and from the ball channels to the ball return channels in a substantially random manner to fill available space.

2. The linear rotary bearing of claim 1 wherein the bearing face is a substantially ring-shaped body having an internal wall in contact with the balls and an exterior wall incorporating the ball return channels.

3. The linear rotary bearing of claim 1 wherein the ball retainer is a plastic or metallic body of unitary construction.

4. The linear rotary bearing of claim 1 wherein the bearing housing is a hollow, substantially cylindrical body.

5. The linear rotary bearing of claim 4 wherein the bearing housing is interference fitted on the ball race.

6. The linear rotary bearing of claim 1 wherein the ball retainer forms a plurality of arcuate surfaces, said arcuate surfaces comprising the ball channels and conforming to the spherical surfaces of the balls.

7. A bearing adapted for linear and rotary motion on an elongated shaft of cylindrical cross-section having a smooth exterior bearing surface, the bearing comprising:
    a bearing race having an annular internal bearing surface disposed in a substantially parallel spaced relationship to the external surface of the shaft;
    a plurality of balls;
    retainer means mounted between the bearing race and the shaft for forming between the race and the shaft a plurality of longitudinal ball channels substantially aligned with the longitudinal axis of the shaft, for permitting longitudinal movement of balls in the channels and for preventing circumferential movement of the balls on the surface of the shaft;
    an outer housing member mounted to the bearing race to enclose the bearing;
    a plurality of channel means disposed between the bearing race and the outer housing forming a plurality of longitudinal ball return channels for permitting longitudinal movement of the balls in the ball return channels, and
    annular chamber means enclosed by the outer housing for permitting movement of balls from the ball channels to the ball return channels substantially randomly to fill available space, the number of balls in the bearing having such relationship to the combined space available in the ball channels, ball return channels, and annular chamber means that the combined space is not entirely filled with the balls.

8. The bearing of claim 7 wherein the channel means comprise a plurality of longitudinal slots machined into the bearing race.

9. The bearing of claim 7 wherein the retainer means comprise a body having a pair of ring-shaped members spaced parallel relative to one another, disposed in a substantially concentric relationship with the shaft and interconnected with a plurality of elongated members, the elongated members forming the longitudinal ball channels.

10. The bearing of claim 9 wherein the retainer means comprise a plastic body of unitary construction.

11. The bearing of claim 7 wherein the annular chamber means comprise an annular space formed at each end of the bearing between the outer housing and the bearing race.

12. The bearing of claim 11 wherein the outer housing comprises an interior wall which forms a wall of the annular space, said interior wall having a curvature adapted for guiding balls from the ball channels into the ball return channels and from the ball return channels into the ball channels.

13. The bearing of claim 7 wherein the outer housing is interference fitted on the bearing race.

14. In a bearing adapted for linear and rotary motion on an elongated shaft of substantially cylindrical cross-section, the bearing having a plurality of balls disposed for rolling contact with the shaft, a bearing race in rolling contact with at least some of the balls, an outer housing enclosing the bearing race and the balls, a plurality of longitudinal ball channel means for permitting longitudinal motion of the balls contacting the shaft when the bearing moves linearly on the shaft, a plurality of ball return channel means for permitting longitudinal motion of the balls and return of the balls to the ball channel means as the bearing moves linearly on the shaft, the improvement comprising:
    means for permitting the balls to move from the ball channel means to the ball return channel means and from the ball return channel means to the ball channel means substantially randomly to fill available space, whereby no ball channel means are dedicated to any specific ball return channel means for circulation of the balls when the bearing moves linearly on the shaft.

15. The improvement of claim 14 wherein the means for permitting the balls to move comprise an annular chamber incorporated between the bearing race and the outer housing.

16. The improvement of claim 15 wherein the total number of the balls in the bearing is insufficient to fill the combined space of the annular chamber, of the ball channel means, and of the ball return channel means.

17. The improvement of claim 16 wherein the outer housing incorporates a curved inner wall comprising means for guiding the balls from the ball channel means to the ball return channel means.

18. The improvement of claim 17 wherein the ball return channels means comprise slots incorporated into an outwardly disposed surface of the ball race.

19. The improvement of claim 18 wherein the bearing further comprises a ball retainer mounted in annular space between the bearing race and the shaft, and wherein the ball channel means comprise longitudinal channels formed in the retainer.

20. The improvement of claim 19 wherein the retainer is a body of unitary construction.

* * * * *